(12) United States Patent
Quigley (10) Patent No.: US 9,545,871 B2
(45) Date of Patent: Jan. 17, 2017

(54) IN-VEHICLE LIFT MECHANISM

(71) Applicant: LIPPERT COMPONENTS MANUFACTURING, INC., Elkhart, IN (US)

(72) Inventor: Patrick W. Quigley, South Bend, IN (US)

(73) Assignee: Lippert Components Manufacturing, Inc., Elkhart, IN (US)

( * ) Notice: Subject to any disclaimer, the term of this patent is extended or adjusted under 35 U.S.C. 154(b) by 135 days.

(21) Appl. No.: 14/454,614

(22) Filed: Aug. 7, 2014

(65) Prior Publication Data

US 2015/0041601 A1  Feb. 12, 2015

Related U.S. Application Data

(60) Provisional application No. 61/863,964, filed on Aug. 9, 2013.

(51) Int. Cl.
| | | |
|---|---|---|
| *B60P 3/39* | (2006.01) | |
| *B66D 1/60* | (2006.01) | |
| *F16M 11/24* | (2006.01) | |
| *H02P 7/06* | (2006.01) | |
| *H02P 31/00* | (2006.01) | |

(52) U.S. Cl.
CPC . *B60P 3/39* (2013.01); *B66D 1/60* (2013.01); *F16M 11/24* (2013.01); *H02P 7/06* (2013.01); *H02P 31/00* (2013.01)

(58) Field of Classification Search
CPC ............ A47C 17/84; A47C 17/80; B60P 3/39; B66D 1/60; F16M 11/24; H02P 7/06; H02P 31/00

USPC ...... 5/11, 10.2, 118; 318/599, 811; 388/800, 388/804, 811, 819; 248/125.1

See application file for complete search history.

(56) References Cited

U.S. PATENT DOCUMENTS

| | | | | |
|---|---|---|---|---|
| 2,958,528 A | * | 11/1960 | Wikelund | A63B 63/083 248/320 |
| 3,684,916 A | * | 8/1972 | Skinner | B60Q 9/001 315/82 |
| 4,097,791 A | * | 6/1978 | Bivens | B66F 9/24 307/141 |
| 4,353,019 A | * | 10/1982 | Sweeney, Jr. | G05B 19/23 318/561 |
| 4,790,611 A | * | 12/1988 | Craner | A47B 57/00 108/147 |
| 5,331,262 A | * | 7/1994 | Francisco | G05B 19/416 318/452 |
| 5,377,787 A | * | 1/1995 | Chabrier | A47C 17/84 187/206 |
| 5,984,404 A | * | 11/1999 | Novoa | B62D 33/0612 296/190.01 |
| 6,629,322 B1 | * | 10/2003 | Monroe | A47C 17/84 5/10.2 |

(Continued)

OTHER PUBLICATIONS https://www.digikey.com/Web%20Export/Supplier%20Content/Crydom_172/PDF/crydom-solid-statements-dc-motor-reversing.pdf?redirected=1 by Crydom; Jan. 2013.*

(Continued)

*Primary Examiner* — Ingrid M Weinhold
(74) *Attorney, Agent, or Firm* — Barnes & Thornburg LLP (57) ABSTRACT

A lift mechanism for an RV holds the elevation of a lift mechanism for a period of time after the operator releases the switch to give the operator time to secure the elevation.

19 Claims, 9 Drawing Sheets

(56) References Cited

U.S. PATENT DOCUMENTS

| | | | | |
|---|---|---|---|---|
| 7,347,484 B2* | 3/2008 | Nebel | ............... | A47C 17/80 296/156 |
| 7,610,636 B2* | 11/2009 | Holmes | ............... | B60P 3/36 105/317 |
| 2004/0262949 A1* | 12/2004 | Rasmussen | ............ | A47C 17/84 296/158 |
| 2005/0239586 A1* | 10/2005 | Nebel | ............... | A63H 17/05 474/58 |
| 2006/0066131 A1* | 3/2006 | Nebel | ............... | B60P 3/39 296/156 |
| 2007/0226901 A1* | 10/2007 | Pervorse | ............ | A47C 17/84 5/118 |
| 2008/0116012 A1 | 5/2008 | Ferguson | | |
| 2008/0129086 A1* | 6/2008 | Holmes | ............... | B60P 3/36 296/190.02 |
| 2009/0136329 A1* | 5/2009 | Roberts | ............ | B60B 29/002 414/401 |
| 2013/0154532 A1* | 6/2013 | Otte | ............... | H02P 3/08 318/466 |
| 2014/0210391 A1* | 7/2014 | Bozic | ............... | H02P 6/181 318/400.11 |
| 2015/0028787 A1* | 1/2015 | Sekine | ............... | B66F 9/24 318/494 |

OTHER PUBLICATIONS http://www.serelays.com/library/Launch-TimerDemo/Long %20Descriptions.pdf Schneider Electric Time Delay Relay Functions Feb. 27, 2012.* http://www.learnabout-electronics.org/Oscillators/osc46.php Learn about electronics Module 4.6: Pulse Width Modulation Eric Coates Mar. 9, 2013.*

International Search Report and Written Opinion, issued in Int'l Pat. Appl. No. PCT/US2014/050191, dated Jan. 30, 2015.

* cited by examiner

PRIOR ART

FIG. 11

IN-VEHICLE LIFT MECHANISM

CROSS-REFERENCE TO RELATED APPLICATIONS

This application claims benefit under 35 U.S.C. §119 of U.S. Provisional Patent Application No. 61/863,964, filed on Aug. 9, 2013, and incorporates by reference the disclosure thereof.

FIELD OF THE INVENTION

The present invention relates to recreational vehicles, and more particularly to lifting mechanisms for raising and lowering furniture within the interiors of such vehicles.

BACKGROUND OF THE INVENTION

Lift mechanisms are used in recreational vehicles to elevate a bed or sofa above a storage area when the storage area is used for storage, typically for storing a vehicle like an ATV, motorcycle or car, and to lower the furniture to a use position when the area is used as a living area. Such mechanisms are often referred to as bunk lifts. It is typically electrically operated by a cable system or other power operated lifting and lowering system. Once in position, in either the use or storage position, the vertical position of the frame supporting the mattress or other furniture is secured in position by manually inserting a pin through two aligned holes, one in the vertically movable frame and the other in the vertical supports that hold the frame up. When the lift or lower button that activates the motor that powers the drive system is released, the operator walks over to the lift and inserts the pin or pins if more than one is used. The problem is that sometimes the lift will creep out of position after the operator releases the button, making it difficult to align the holes to insert the pins.

This invention addresses that issue.

SUMMARY OF THE INVENTION

The invention provides a lift mechanism for an RV that holds the elevation of the lift mechanism for a period of time after the operator releases the switch to give the operator time to secure the elevation.

The lift mechanism is for lifting or lowering a support member in an interior of a recreational vehicle. The lift mechanism includes a frame connected to the support member so the support member is movable vertically relative to the frame and a drive unit that drives the support member to lift the support member relative to the frame and control the descent of the support member relative to the frame. The operator actuates a switch to control the drive unit to cause the drive unit to lift the support member to a storage position or lower the support member to a use position, and inserts one or more pins to secure the support member relative to the frame in at least one of the two positions. After the operator releases the switch, the drive unit is kept on for a period of time to exert a level of force on the support member that stops movement of the support member but holds its elevation.

Preferably, after the period of time the drive unit is kept on at the reduced level to stop but hold the elevation, the system turns the drive unit off.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

The concepts described below and shown in the accompanying figures are illustrative of an example implementation of the inventive concepts; however, when given the benefit of this disclosure, one skilled in the art will appreciate that the inventive concepts described herein can be modified and incorporated into many other applications. Furthermore, throughout the description terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

Figure 1:
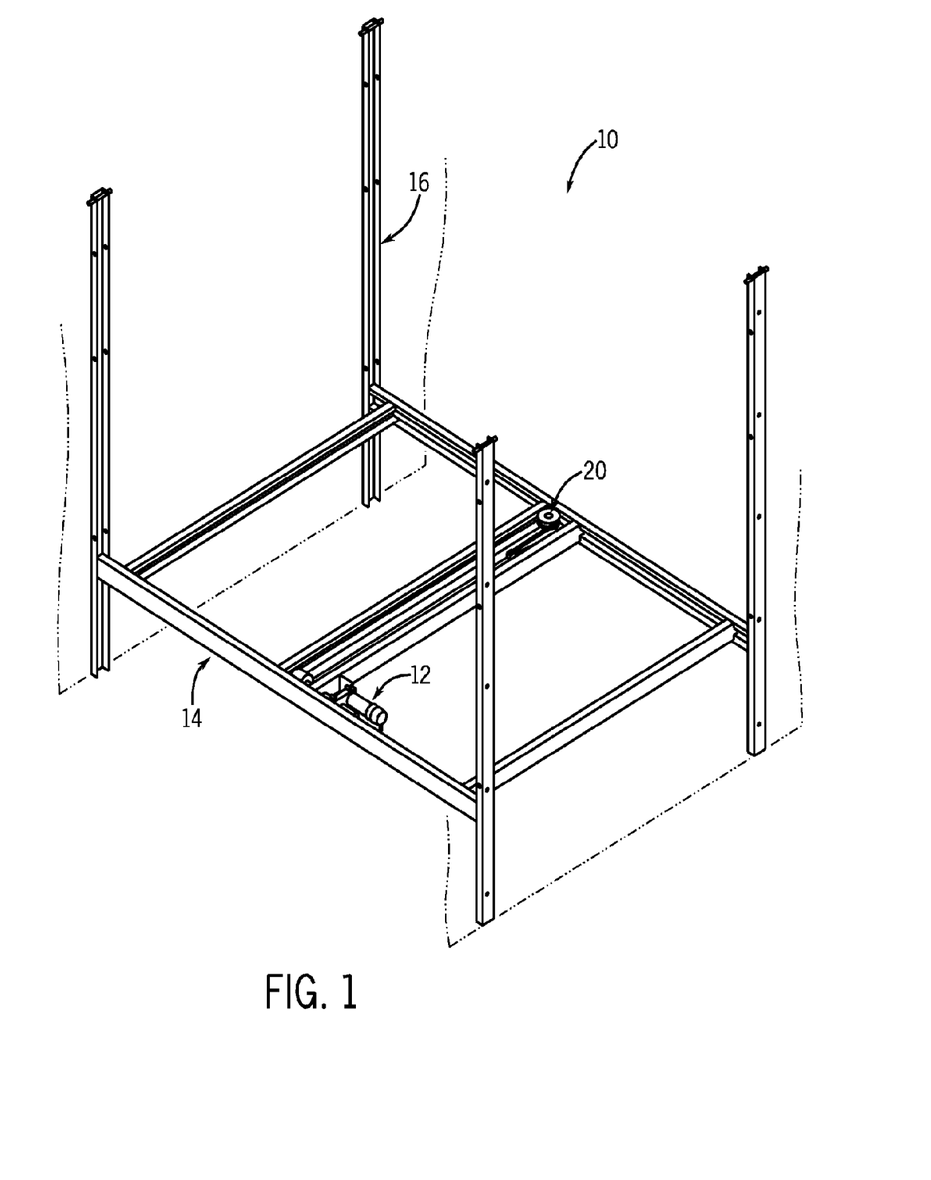
FIG. 1 is a rear perspective view of a bunk lift mechanism for an interior of a vehicle, showing a support assembly in a lowered position.
Figure 2:
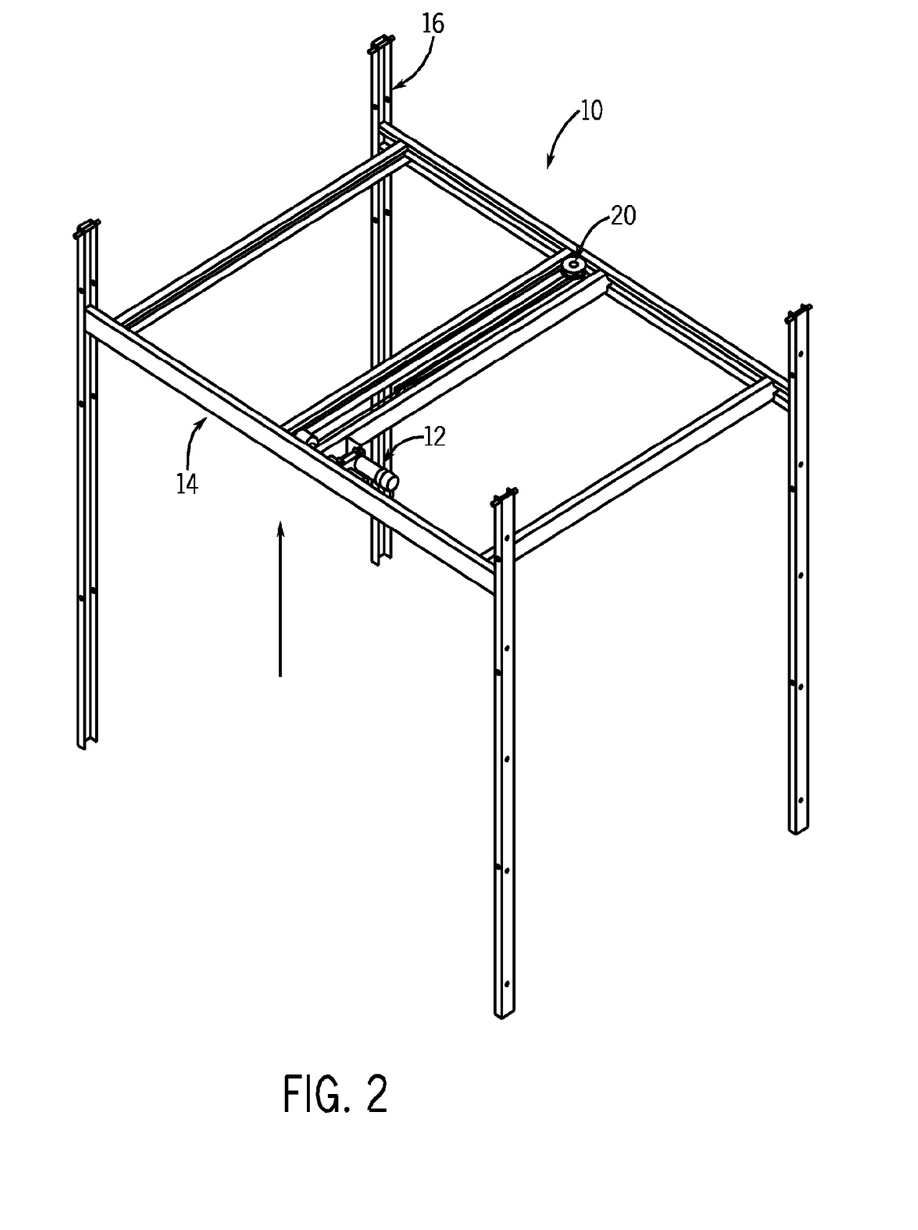
FIG. 2 is a rear perspective view similar to FIG. 1 albeit showing the support assembly in an elevated position.

Although not shown in the drawings, the present invention is preferably used in a passenger vehicle, such as a tow-along trailer or self-propelled (motorhome) recreational vehicle. The lift mechanism 10 shown in FIGS. 1-3 can be advantageously used to vertically elevate a bed, couch or other furniture, and thereby clear floor space in the interior of the vehicle in the elevated storage position. It could also be positioned straddling a pullout couch to create two beds when the couch is pulled out and the movable platform is lowered to a position spaced below the ceiling and spaced above the couch bed. The lift mechanism 10 is shown in its lowered position in FIG. 1 and shown elevated in FIG. 2. The lift mechanism 10 can be mounted within an extendable and retractable slide-out section of the vehicle to provide further space-saving benefits. Such slide-out sections are well known to have a floor, ceiling, upright end wall and two upright side walls, which form a part of the vehicle exterior when extended.

Figure 3:
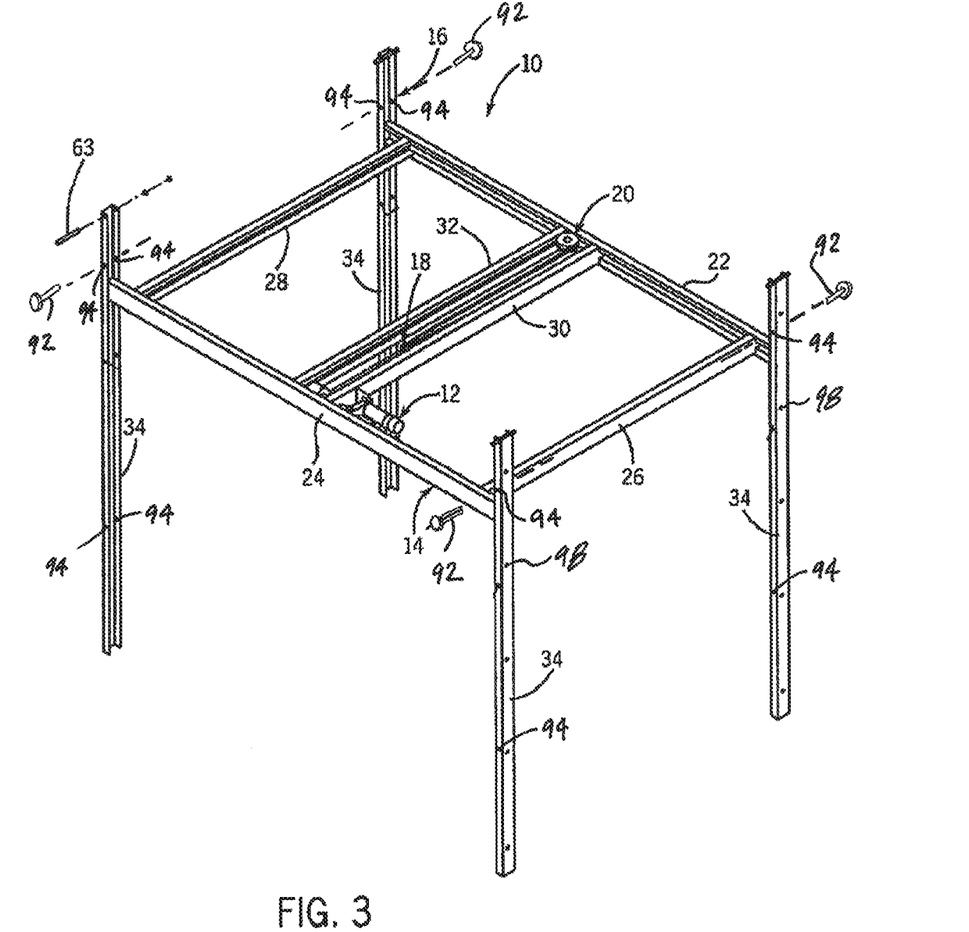
FIG. 3 is a rear perspective view similar to FIG. 2.
Figure 4:
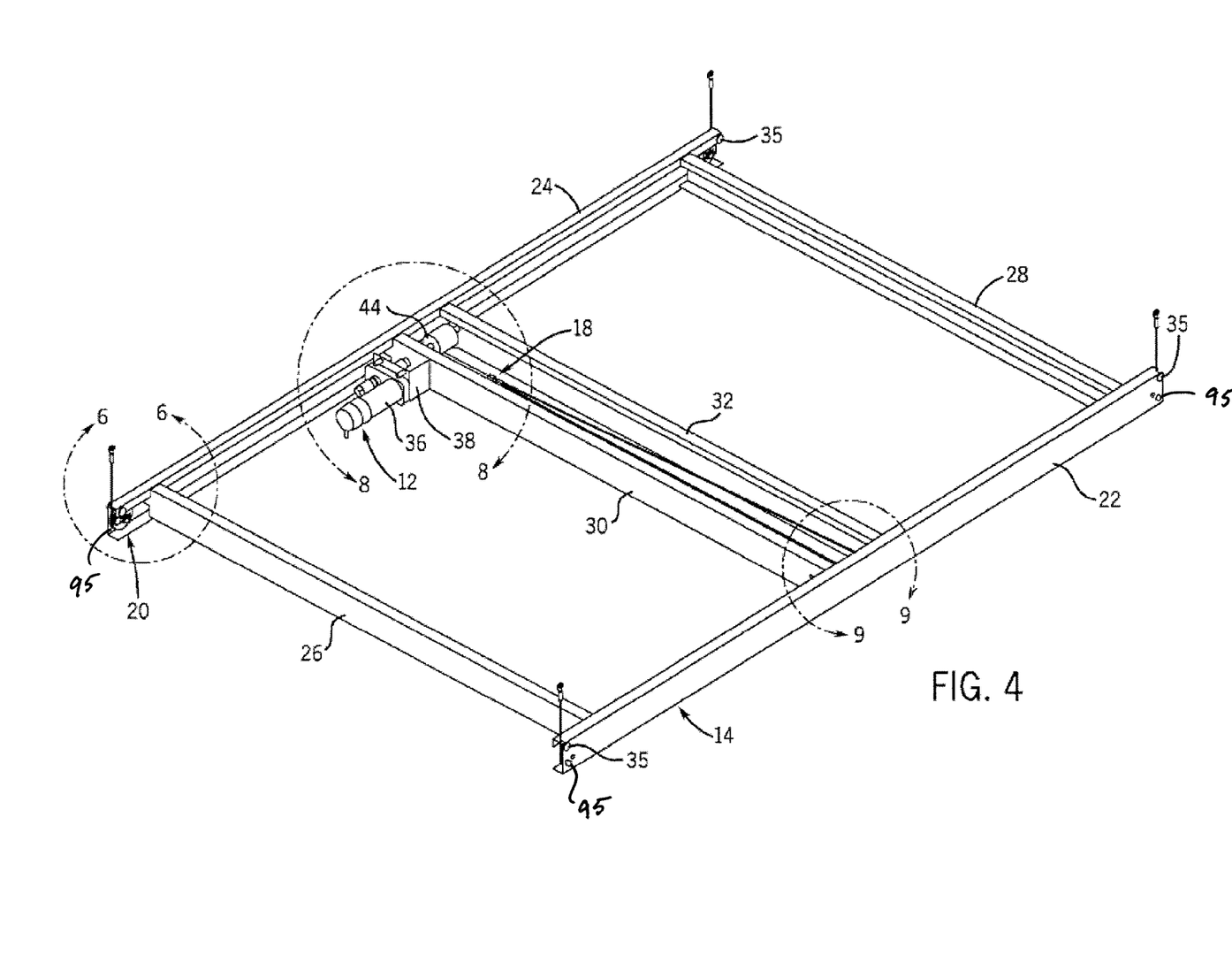
FIG. 4 is a perspective view of the lift mechanism albeit without an upright frame assembly.

Referring now to FIGS. 1-4, the primary components of the lift mechanism 10 include a drive unit 12, a support assembly 14, an upright frame assembly 16, a flexible drive assembly 18 and a guide assembly 20. As best shown in FIG. 4, the support assembly 14 is a framework of channel members including long front 22 and back 24 channels and shorter end channels 26 and 28 and center channels 30 and 32, with the open face of each channel facing inward toward the center. The channels are joined in any suitable manner, such as by weldment or mechanical fasteners, using any standard joinery, such as overlapped or recessed joints. In the embodiment shown in the drawings, the support assembly 14 is sized to support a standard or other sized mattress (not shown) with or without its own frame or box spring.

Figure 7:
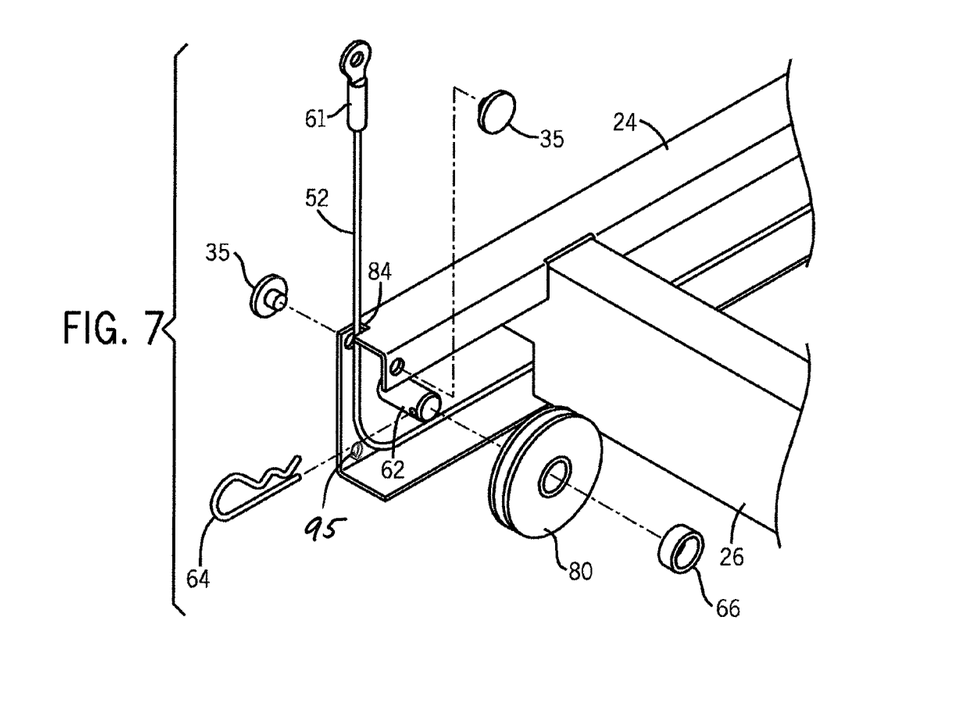
FIG. 7 is an exploded perspective view thereof.

As shown in FIG. 3, the upright frame assembly 16 includes four vertical channel members 34 at the four corners of the support assembly 14. The open faces of these channels 34 receive the ends of the front 22 and back 24 channels allowing the support assembly 14 to move up and down therein. Wear pads 35 mounted to the front 22 and back 24 channels (as shown in FIG. 7), or any bushings, rollers or other friction reducing members, can be used at this junction to facilitate easier and smoother movement. The channels 34 of the upright frame assembly 16 are bolted or otherwise fixed to opposite side walls of the vehicle room or to the floor and ceiling at opposite ends. The top and bottom ends of these channels 34 may be either capped or run full height of the room so that the support assembly 14 can not be decoupled readily.

Figure 8:
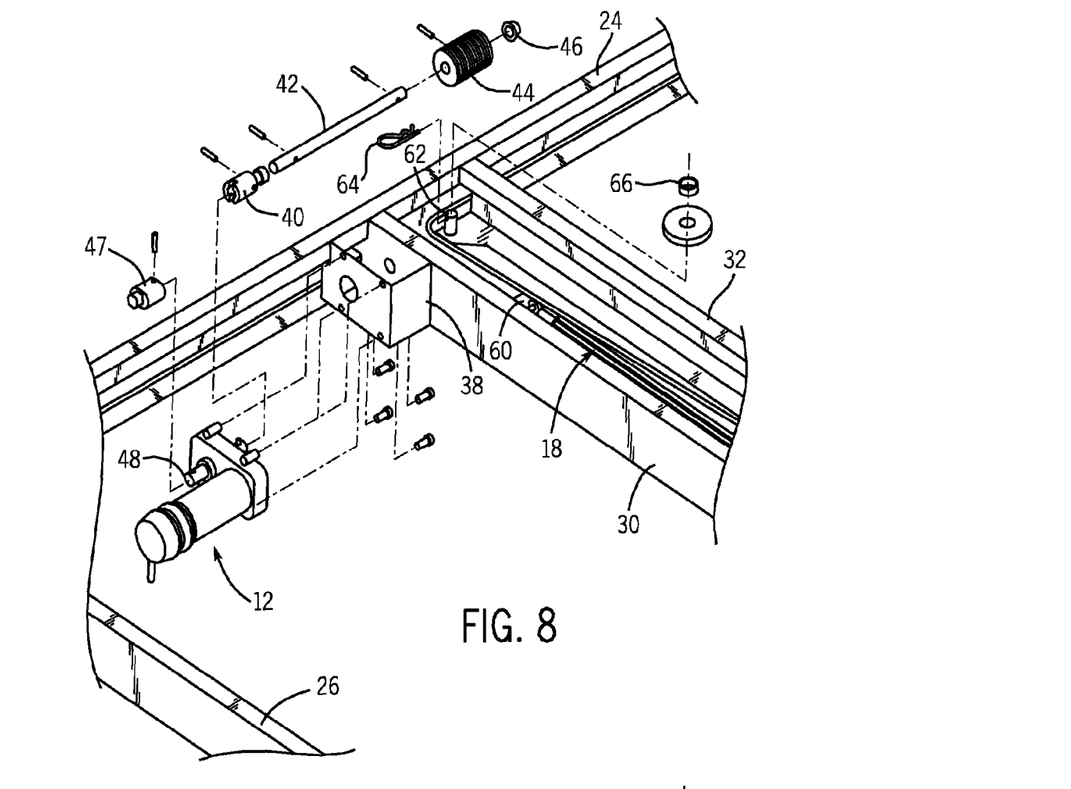
FIG. 8 is an exploded detail view of the assembly outlined in box 8 of FIG. 4.
Figure 9:
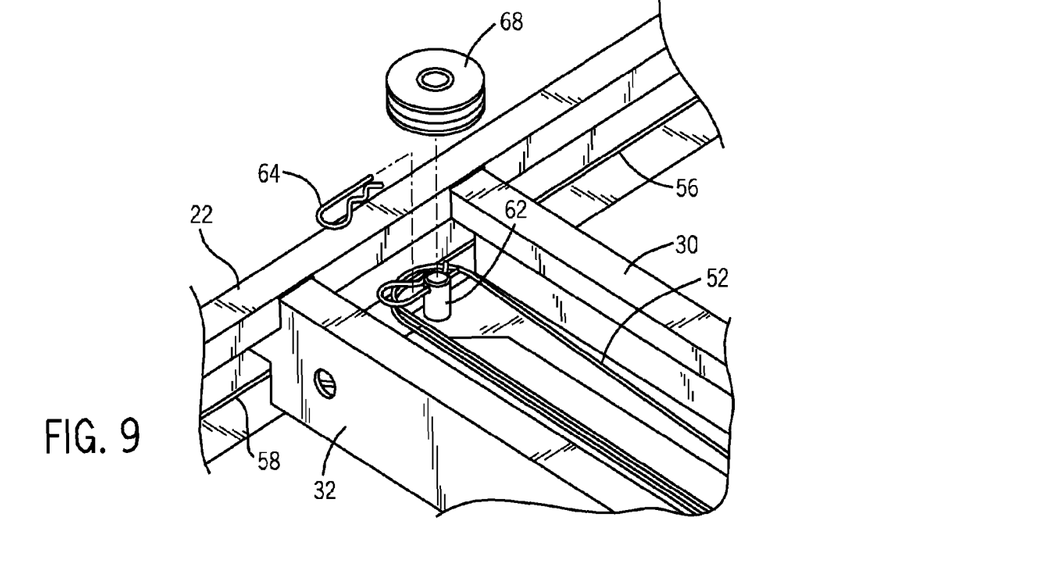
FIG. 9 is a rear detail view of the assembly outlined in box 9 of FIG. 4.

The height adjustment of the support assembly 14 is accomplished by actuating the drive unit 12 to move the flexible drive assembly 18. As shown in FIGS. 4 and 8, the drive unit 12 is preferably a suitable bidirectional electric motor and gear box assembly 36 bolted to a motor mount flange 38 which is welded to the support assembly 14, at the junction of the back channel 24 and the center channel 30. A coupler 40 is mounted to the output stub of the motor/gear assembly 36 to connect a spindle shaft 42 in turn mounting a spindle 44 and a retaining bushing 46. The shaft 42 extends through openings in the motor mount flange 38 and the center channel 30 so that the spindle 44 is disposed in the space between the two center channels 30 and 32. A hex coupler 47 is mounted to a rearward output stub 48 of the motor/gear assembly 36 to permit manual rotation or the shaft 44 for service or in the event of power failure.

Figure 5:
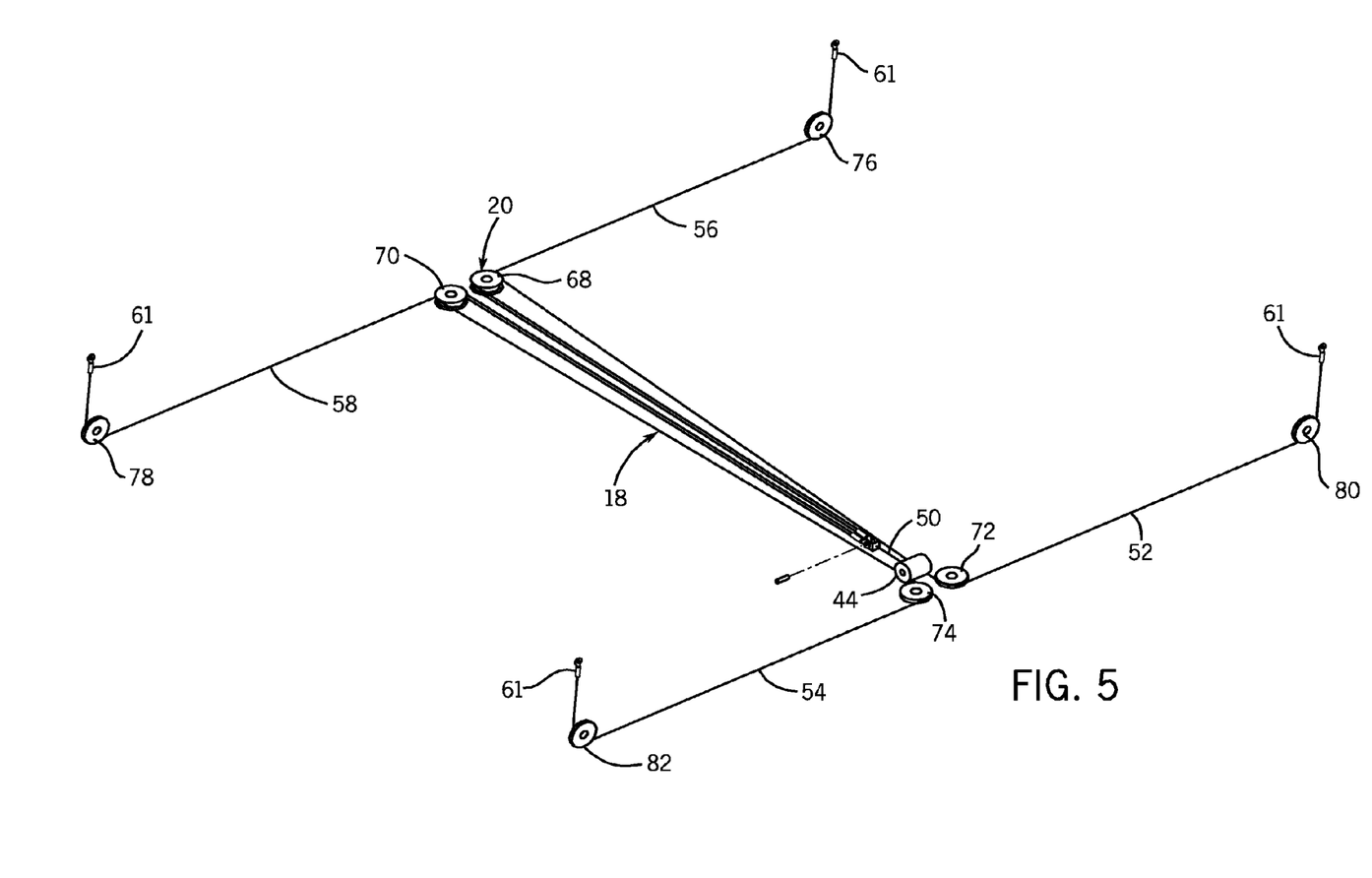
FIG. 5 is a rear perspective view showing a cable and pulley arrangement of the lift mechanism.
Figure 6:
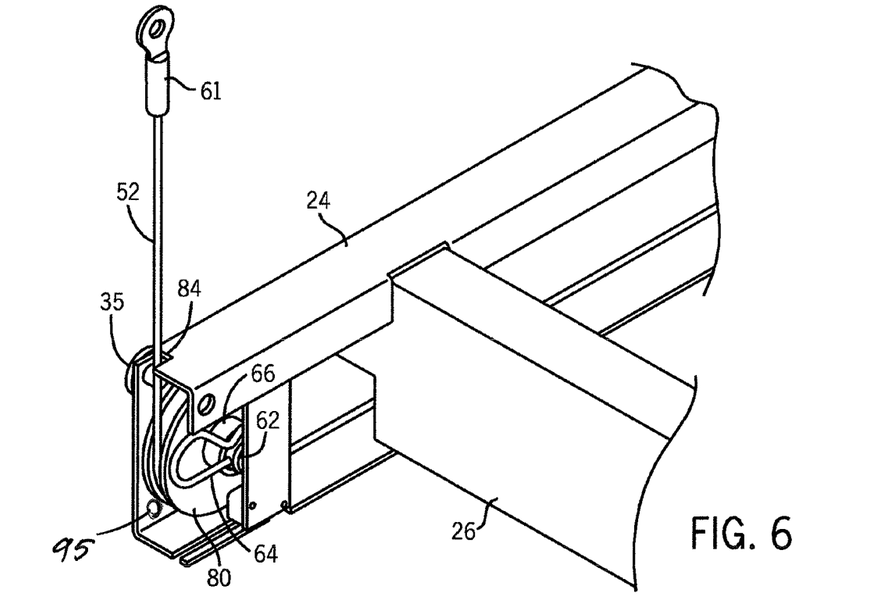
FIG. 6 is a detail view of the assembly outlined by box 6 in FIG. 4.

Operation of the motor gear assembly 36 turns the spindle 44 which moves the flexible drive assembly 18. As shown in FIG. 5, in the preferred embodiment the flexible drive assembly 18 is an assembly of cables. Specifically, the assembly includes a leader cable 50, two long cables 52 and 54, and two short cables 56 and 58. One end of each cable 52-58 is coupled via a crimp coupler 60 together with the other cables and to an end of the leader cable 50. The other end of the leader cable 50 is coupled to the spindle 44 so that the leader cable 50 is wound about the spindle 44 when the shaft 42 is turned. Clockwise rotation of the shaft 42 winds the leader cable 50 onto the spindle 44 and counter-clockwise rotation unwinds the leader cable 50 from the spindle 44, so when unwinding gravity lowers the support assembly 14.

This in turn causes the other cables 52-58 to move through the support 14 and upright frame 16 assemblies as directed by the guide assembly 20, and thereby raise or lower the support assembly 14 because the non-coupled ends of the cables 52-58 are fixed to the tops of the channel members 34 by fasteners 63 (see FIG. 3), or to the vehicle room frame (such as ceiling joists), via connectors 61. As shown in FIGS. 5-7 and 9, the guide assembly 20 includes a number of pulleys or sheaves mounted on stub shafts 62, with a clip pin 64 separated from the pulley by a spacer 66, at various locations of the support assembly 14. Specifically, the guide assembly 20 has two horizontally oriented double groove pulleys 68 and 70 mounted to the respective center channels 30 and 32 near their junction with the back channel 24 just behind the spindle 44. Two horizontally oriented single groove pulleys 72 and 74 mounted to the respective center channels 30 and 32 at their junction with the front channel 22. Two vertically oriented single groove pulleys 76 and 78 (and 80 and 82) are mounted to opposite ends of both the front 22 and back 24 channels.

The arrangement of the guide assembly 20 defines the cable assembly pathway as shown in FIG. 5. In particular, the short cables 56 and 58 extend from the crimp coupler 60 and between the two double groove pulleys 68 and 70, with cable 56 wrapping approximately 90 degrees around the bottom groove of pulley 68 and then around (again about 90 degrees) and up pulley 76. Similarly, cable 58 wraps around the bottom groove of pulley 70 and up and around pulley 78. The long cables 52 and 54 also extend back from the crimp coupler 60 between the double groove pulleys 68 and 70. However, cable 52 wraps around the upper groove of pulley 68 approximately 180 degrees and doubles back between the single groove pulleys 72 and 74 where it wraps around pulley 72 approximately 90 degrees and then around and up (again approximately 90 degrees) pulley 80. Cable 54 follows a similar (mirror image) path albeit wrapping around the upper groove of pulley 70 approximately 180 degrees and then pulleys 74 and 82, each approximately 90 degrees. The front 22 and back 24 channels have small notches 84 through which vertical lengths of the cables 52-58 pass after/before engaging the vertical pulleys 76-82.

As mentioned, operating the drive unit 12 to rotate the shaft 42 clockwise will cause the leader cable 50 to wind upon the spindle 44. This causes the leader cable 50 to pull the other cables 52-58 from front to back, thereby shortening their effective length and raising the support assembly 14. Note that the lengths of the cables are selected so that none of the other cables 52-58 wind onto the spindle 44, even when the support assembly 14 is fully raised. Reversing direction of the motor/gear assembly 36 will unwind the leader cable 50 and effectively lengthen the other cables 52-58, thereby lowering the support assembly 14. A motor control, limit switch or other devices (not shown) can be used to set the limits of vertical travel.

Thus, in the preferred embodiment, a bunk bed can be raised up out of the way when not being used, which increases the effective floor space in the room. When needed, it can be lowered into place for use. The operation can be performed using a switch, for example, a simple wall switch mounted in a convenient location. Various space monitoring devices, such as photo-sensors and the like, can be used to prevent the support assembly 14 from being lowered when objects or people are in the space directly below it.

Once in position, whether an up or down position, a use or storage position, a first or second position, or an intermediate position, the vertical position of the frame supporting the mattress or other furniture is secured in position by manually inserting a pin 92 (FIG. 2) through aligned holes 94 in each of the legs 34, that line up with holes 95 (FIGS. 4, 6 and 7) in the rails 22 and 24, near the top of the legs 34 in the storage position and further down at a bed or seating height in the use position. Alternatively, the pins can be inserted through holes 98 in the end faces on all four legs 34 to interfere with and support the assembly 14. When the lift or lower button that activates the motor that powers the drive system is released, the operator walks over to the lift and inserts the pins 92 to secure the height of the support assembly 14.

Figure 10:
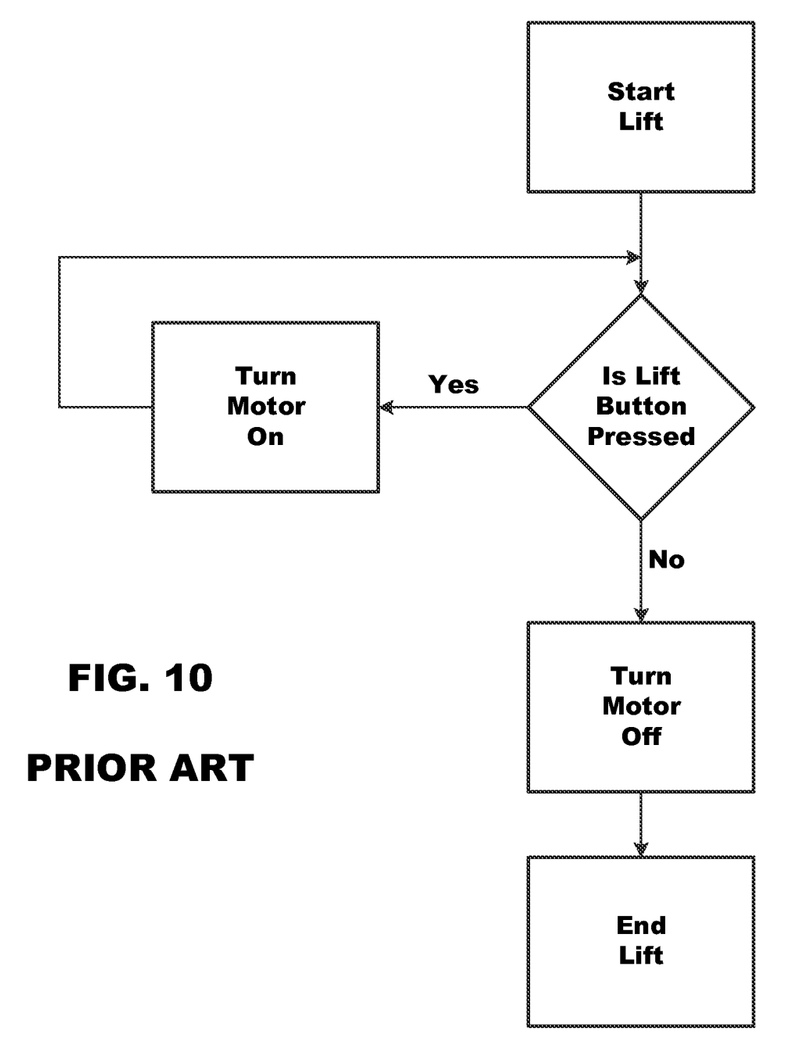
FIG. 10 is a typical prior art sequence for operating the lift.

FIG. 10 illustrates a typical control sequence for the lifting/lowering operation. This could represent a simple circuit with a three position up/off/down switch wired directly to a bi-directional 12 volt DC motor, or there could be a more sophisticated programmable electronic control unit between the switch and motor performing this function. If the button is not pressed, the motor turns off under this control sequence and the friction of the system is relied upon to hold the level of the platform 14 until the operator can insert the pins 92. Sometimes, however, the assembly 14 will creep out of position after the operator releases the button, making it difficult to align the holes 94 and 95 to insert the pins 92.

Figure 11:
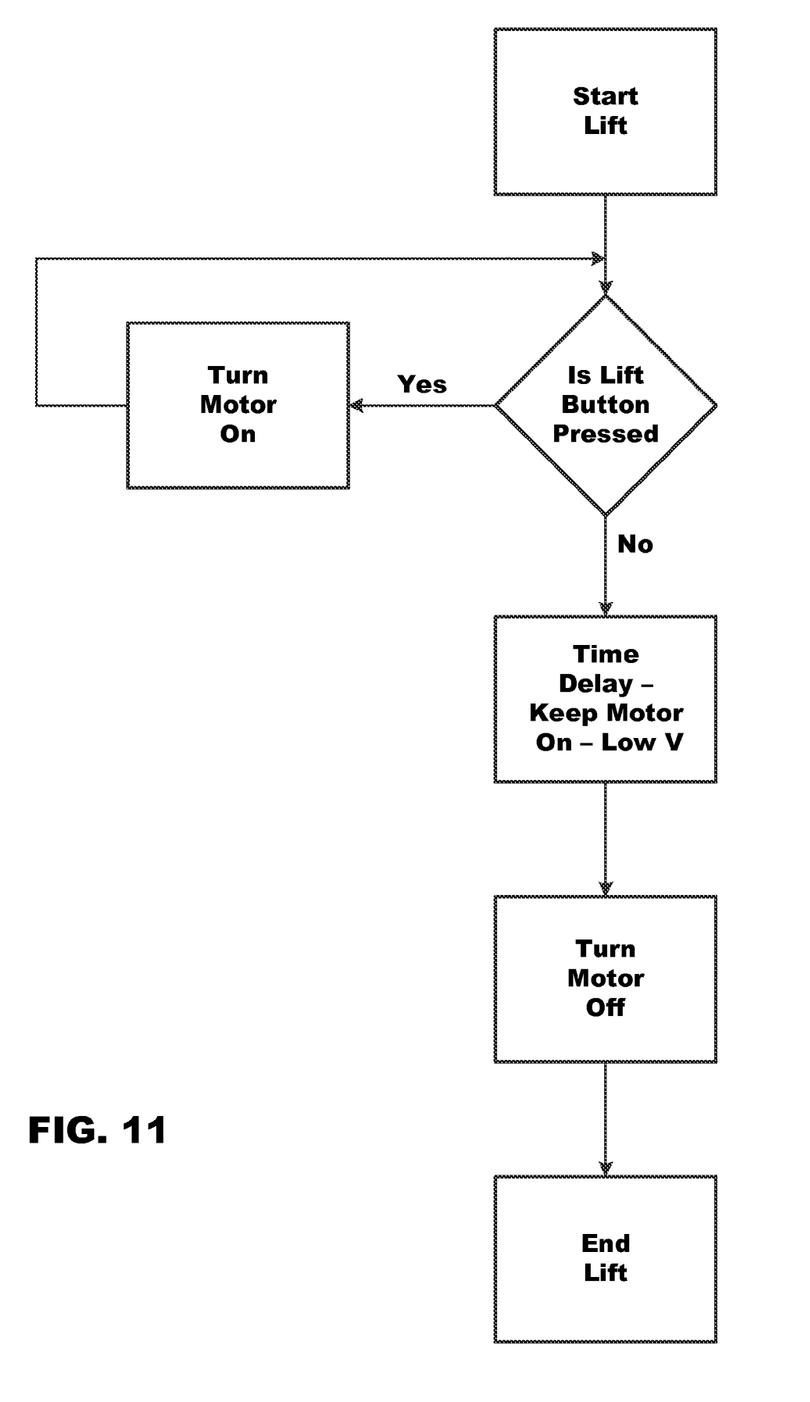
FIG. 11 is a sequence for operating the lift of the invention.

FIG. 11 illustrates a control sequence of the invention that remedies this problem. In FIG. 11, after the button is released, the motor is kept on but at a reduced voltage that is sufficient to stop the lifting or lowering of the assembly 14, but hold it from creeping under the influence of gravity. With a fully charged system (about 13.7 volts) the motor moves the assembly when the full voltage is applied to it. Ideally, the system will still be capable of lifting and lowering the assembly 14 even if only about 12 volts are available from the power supply of the RV. The voltage for holding the height of the assembly 14 without moving it may be in the range of about 6-9 volts or another voltage sufficient to enable the motor and drive unit to hold the weight of the support member, but not so much as to lift it or cause it to move under the torque of the motor. The reduced voltage could be provided using a variable power supply or by pulse-width-modulating the full system voltage to provide an average voltage to the motor in the foregoing range. After a period of time, e.g., about 30 seconds—enough for the operator to insert the pins—the motor is turned off completely, so as to not unduly drain the batteries of the RV.

This sequence can also be applied to a more sophisticated control system. For example, if applied to a control system for the lift 10 that works more like an electric garage door opener, where a single press and release of a button initiates lifting or lowering until stops are reached, and another press during motion stops it. The stops may be provided by a bolt or weldment to the legs 34 that the support assembly 14 abuts in either the storage position or the use position. At that elevation, against the stops, the holes 94 and 95 are aligned. For example, after the upper stop is reached, the motor is held on at a reduced voltage sufficient to hold the assembly 14 against downward movement. After a period of time the motor is turned off completely.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

A preferred embodiment of the invention has been described in considerable detail. Many modifications and variations to the preferred embodiment described will be apparent to a person of ordinary skill in the art. Therefore, the invention should not be limited to the embodiment described.

I claim:

1. A lift mechanism for lifting and lowering a support member in an interior of a vehicle, the lift mechanism comprising:

a frame connected to the support member so the support member is movable vertically relative to the frame;

a drive unit that drives the support member to lift the support member relative to the frame and control descent of the support member relative to the frame;

a switch that is actuated to energize the drive unit and thereby to cause the drive unit to lift the support member to a first position or lower the support member to a second position;

at least one pin to secure the support member relative to the frame in at least one of the first position and the second position;

wherein after the switch is released; the drive unit stays energized for a predetermined period of time so as to hold the support member at the elevation the support member is in at the time the switch is released and to prevent creeping of the support member with respect to the frame under the influence of gravity to allow for insertion of the pin.

2. The lift mechanism of claim 1, wherein the drive unit is electrically powered.

3. The lift mechanism of claim 2, wherein the drive unit includes an electric motor.

4. The lift mechanism of claim 3, wherein the electric motor receives full voltage when the switch is actuated and the electric motor receives reduced voltage for the predetermined period of time after the switch is released.

5. The lift mechanism of claim 4, wherein the full voltage is about 12 to about 13.7 volts and the reduced voltage is about 6 volts to about 9 volts.

6. The lift mechanism of claim 1, wherein the support member is a lateral frame assembly.

7. The lift mechanism of claim 1, wherein after the drive unit stops and holds the support member for the predetermined period of time, the drive unit turns off.

8. The lift mechanism of claim 1, wherein the drive unit lifts the support member up to a storage position at which the support member stops elevating by encountering at least one stop.

9. The lift mechanism of claim 1, wherein each of the support member and the frame includes a hole configured to receive the pin.

10. A method of operating a lift mechanism for lifting and lowering a support member in an interior of a recreational vehicle, wherein the lift mechanism includes a frame connected to the support member so the support member is movable vertically relative to the frame, a drive unit that drives the support member to lift the support member relative to the frame and control the descent of the support member relative to the frame, a switch that is actuated to cause the drive unit to lift the support member to a first position or lower the support member to a second position, and at least one pin to secure the support member relative to the frame in at least one of the first position and the second position, wherein the method includes the step of:

keeping the drive unit on for a predetermined period of time after the switch is released at a reduced torque sufficient to hold but not lift the support member and prevent creeping of the support member with respect to the frame under the influence of gravity to allow for insertion of the pin.

11. The method of claim 10, wherein after said predetermined period of time the drive unit turns off.

12. The method of claim 10, wherein the drive unit includes an electric motor and the method includes the step of providing full voltage to the motor when the switch is actuated to control the drive unit to cause the drive unit to lift the support member to the first position or lower the support member to the second position, and the step of providing reduced voltage to the motor for the predetermined period of time after the switch is released.

13. A lift mechanism for lifting and lowering a support member relative to a frame connected to the support member so the support member is movable vertically relative to the frame, the lift mechanism comprising:
  a drive unit that drives the support member to lift the support member relative to the frame and control descent of the support member relative to the frame, the drive unit including an electric motor;
  at least one pin to secure the support member relative to the frame in at least a first position; and
  a control system including a switch, wherein the control system energizes the electric motor with full voltage when the switch is actuated a first time, thereby causing the drive unit to drive the support member to lift the support member to the first position, and wherein the control system energizes the electric motor with reduced voltage for a predetermined period of time to hold the support member at the first position and prevent creeping of the support member with respect to the frame under the influence of gravity to allow for insertion of the pin when the switch is released or actuated a second time.

14. The lift mechanism of claim 13 wherein the control system energizes the motor with full voltage when the switch is actuated the first time, and wherein the control system energizes the motor with reduced voltage for the predetermined period of time when the switch is released.

15. The lift mechanism of claim 13 wherein the control system energizes the motor with full voltage when the switch is actuated the first time, and wherein the control system energizes the motor with reduced voltage for the predetermined period of time when the switch is actuated the second time.

16. The lift mechanism of claim 13, wherein each of the support member and the frame includes a hole configured to receive the pin.

17. The lift mechanism of claim 13 wherein the control system energizes the electric motor with full voltage when the drive unit drives the support member to lower the support member to a second position and that energizes the electric motor with reduced voltage for a predetermined period of time to hold the support member at the second position.

18. The lift mechanism of claim 17 wherein the control system energizes the electric motor with full voltage when the drive unit drives the support member to move the support member to a third position and that energizes the electric motor with reduced voltage for a predetermined period of time to hold the support member at the third position.

19. The lift mechanism of claim 13 wherein the reduced voltage is provided by pulse-width-modulating the full voltage.

* * * * *